United States Patent [19]
Westeppe et al.

[11] Patent Number: 5,010,138
[45] Date of Patent: Apr. 23, 1991

[54] THERMOPLASTIC INTERPOLYMERS AND THEIR USE IN MIXTURES OF POLYAMIDE AND STYRENE COPOLYMERS AND/OR GRAFT POLYMERS

[75] Inventors: Uwe Westeppe, Mettmann; Karl-Erwin Piejko, Bergisch-Gladbach; Christian Lindner, Cologne, all of Fed. Rep. of Germany

[73] Assignee: Bayer Aktiengesellschaft, Leverkusen-Bayerwerk, Fed. Rep. of Germany

[21] Appl. No.: 389,967

[22] Filed: Aug. 7, 1989

[30] Foreign Application Priority Data

Aug. 16, 1988 [DE] Fed. Rep. of Germany ....... 3827669

[51] Int. Cl.$^5$ ............................................. C08L 77/00
[52] U.S. Cl. ..................................... 525/183; 525/66; 525/179
[58] Field of Search ......................................... 525/103

[56] References Cited

U.S. PATENT DOCUMENTS

| | | |
|---|---|---|
| 3,700,751 | 10/1972 | Mueller et al. ........................ 525/183 |
| 4,246,371 | 1/1981 | Meyer et al. ......................... 525/183 |
| 4,338,406 | 7/1982 | Sanderson et al. ................... 525/183 |
| 4,421,892 | 12/1983 | Kasahara et al. .................... 525/183 |
| 4,554,320 | 11/1985 | Reimann et al. ..................... 525/183 |

Primary Examiner—Ana L. Carrillo
Attorney, Agent, or Firm—Connolly and Hutz

[57] ABSTRACT

The invention relates to thermoplastic interpolymers having a certain chemical composition and to their use in thermoplastic molding compounds of polyamides and styrene copolymers and/or graft polymers for the production of improved blends of polyamides and styrene copolymers and/or graft polymers, particularly ABS polymers, having homogeneous surfaces and improved mechanical properties. The interpolymers themselves are produced by compounding of polyamides and copolymers based on styrenes and/or acrylonitrile and/or (meth)acrylates with primary or secondary alcohols and at least one ester of (meth)acrylic acid with a tertiary $C_{4-10}$ alcohol in the melt. The interpolymers act as compatibility promoters in the blends and lead to a surprising improvement in a number of properties of thermoplastic molding compounds.

10 Claims, No Drawings

THERMOPLASTIC INTERPOLYMERS AND THEIR USE IN MIXTURES OF POLYAMIDE AND STYRENE COPOLYMERS AND/OR GRAFT POLYMERS

This invention relates to thermoplastic interpolymers having a certain chemical composition and to their use in thermoplastic molding compounds of polyamides and styrene copolymers and/or graft polymers for the production of improved blends of polyamides and styrene copolymers and/or graft polymers, particularly ABS polymers, having homogeneous surfaces and improved mechanical properties. The interpolymers themselves are prepared by the compounding of polyamides and copolymers based on styrene and/or acrylonitrile and/or (meth)acrylates with primary or secondary alcohols and at least one ester of (meth)acrylic acid with a tertiary $C_{4-10}$ alcohol in the melt. The interpolymers act as compatibilizer in the blends and lead to a surprising improvement in a number of properties of thermoplastic molding compounds.

US-A-3,134,746 describes blends of polyamide-6 and acrylonitrile/butadiene/styrene (ABS) copolymers which have poor surfaces (delamination). US-A-3,485,777 describes the use of peroxides for improving the properties of blends of polyamide and styrene copolymers. According to DE-A-3 037 520, thermoplastic polymer materials can be produced by compounding from polyamides and styrene copolymers of styrenes and $\alpha,\beta$-unsaturated dicarboxylic anhydrides. EP-A-80 720 describes blends of polyamides and copolymers of styrene and carboxylic acid amides. EP-A-202 214 describes blends of graft products based on styrene, methyl (meth)-acrylate or (meth)acrylonitrile, polyamides and polymeric compatibility promoters (copolymers of styrene, acrylonitrile and maleic anhydride).

The methods used hitherto have appeared either too expensive or have produced inadequate property improvements.

It has now been found that the technological properties of polyamide blends with styrene copolymers and/or graft polymers, preferably of the ABS type, can surprisingly be distinctly improved by addition of special interpolymers and, in particular, can be processed to moldings having good surface properties with no delamination phenomena and, overall, favorable and also improved mechanical properties.

The interpolymers (D) are combination products of polyamides (A) and copolymers (B) with copolymerized monomers containing tertiary ester groups which can no longer be separated into the pure components (A) and (B) (educts) by physical methods, such as fractionation with solvents, etc., i.e. an at least partial chemical link exists between components (A) and (B) (so-called interpolymer formation).

Accordingly, the present invention relates to interpolymers (D) of polyamides (A) and copolymers (B) with a tertiary ester of (meth)acrylic acid, to their use in thermoplastic molding compounds of polyamides (A), vinyl copolymers and/or graft polymers (C) and the interpolymers (D); and to corresponding thermoplastic molding compounds containing polyamides (A), vinyl copolymers and/or graft polymers (C) and interpolymers (D) in quantitative ratios characterized hereinafter.

More particularly, the present invention relates to (1) interpolymers of (A) from 40 to 80% by weight and preferably from 50 to 75% by weight of partially crystalline and/or amorphous polyamides and (B) from 20 to 60% by weight and preferably from 25 to 50% by weight of thermoplastic copolymers or mixtures of several thermoplastic copolymers of (B1) at least 15% by weight, preferably at least 30% by weight and, more preferably, at least 45% by weight of at least one monomer from the group consisting of (B1.1) at least 30% by weight. styrenes and $\alpha$-methylstyrenes which may also be alkyl-, haloalkyl- and/or halogen-substituted and, optionally, from 0 to 50% by weight, preferably from 10 to 50% by weight and more preferably from 20 to 40% by weight of other monomers from the group consisting of (B1.2) acrylonitrile, methacrylonitrile, vinyl-$C_{1-4}$-carboxylic acids vinyl acetate and esters of acrylic or methacrylic acids with primary or secondary $C_{1-10}$ alcohols, and (B2) from 0.5 to 35% by weight, preferably from 1 to 20% by weight and more preferably from 1.5 to 15% by weight of at least one ester of acrylic or methacrylic acid with tertiary $C_{4-10}$ alcohols in quantities of up to 35% by weight (B2) in the copolymer (B), prepared by homogenization of components (A) and (B) in the melt in standard mixing or kneading units at temperatures above the melting point of the higher-melting component until the interpolymers are formed.

The present invention also relates to the use of interpolymers (D) (based on polyamides (A) and copolymers (B)) as compatibilizer for the production of thermoplastic polymer mixtures having homogeneous surfaces and improved mechanical properties on the basis of (A) at least 30% by weight, preferably at least 50% by weight, but no more than 89.5% by weight of polyamide, more especially from 50 to 70% by weight polyamide, (C) [100 minus (A+D)] and preferably from 10 to 49% by weight of vinyl copolymers (C1) and/or vinyl graft polymers (C2), but always at least 10% by weight C, preferably at least 15% by weight C and more preferably from 30 to 49% by weight (C), (D) from 0.5 to 25% by weight, preferably from 1 to 20% by weight and more preferably from 1 to 10% by weight of interpolymers.

The polymer mixtures may additionally contain standard additives in typical effective quantities. Accordingly, component (C) is used in such a quantity that the sum total of components (A+C+D) is 100%, although at least 10% by weight of component (C) is present in the polymer mixture.

The present invention relates to corresponding thermoplastic molding compounds having an improved surface and improved mechanical properties of (A) at least 15% by weight, preferably at least 30% by weight and more preferably from 50 to 70% by weight polyamide, (C) from 0.5 to 25% by weight, preferably from 1 to 20% by weight and more preferably from 1 to 10% by weight interpolymer of polyamide (A) and copolymer (B), (D) and 100 minus (A+D) % by weight vinyl copolymers and/or vinyl graft polymers C), but always at least 10% by weight and more preferably from 30 to 49% by weight (C).

No more than 89.5% by weight of component (A) are used.

The new interpolymers (D) are prepared by homogenization of components (A) and (B) in the melt at temperatures above the melting point of the higher-melting component, for example in standard mixing or kneading units, such as extruders, Banbury mixers or the like, the formation of the interpolymers (D) taking place during mixing by chemical linking of components (A) and (B). The exact structure of the products formed is still not known at present. However, polymer-analytical investigations have shown that interpolymers are present because they can no longer be separated into their starting products. The average residence time in the melt up to formation of the interpolymers can be shorter, the higher the melting temperature. The average residence time is at least 0.5 minute and preferably between 1 and 3 minutes. The melting temperature above the melting temperature of the higher-melting component is generally limited by that temperature at which significant degradation phenomena occur. The residence time is determined not only by the apparatus used but also by the homogeneity of mixing and by adequate interpolymer formation. The minimum residence time generally decreases with increasing content of component (B2) in the copolymer B.

Polyamides A

The polyamide component (A) of the interpolymers (D) or molding compounds according to the invention may consist of any partially crystalline polyamides, particularly polyamide-6, polyamide-6,6, and partially crystalline copolyamides based on these two components. Also suitable are partially crystalline polyamides of which the acid component consists in particular completely or partly (besides adipic acid or caprolactam) of terephthalic acid and/or isophthalic acid and/or suberic acid and/or sebacic acid and/or azelaic acid and/or dodecane dicarboxylic acid and/or adipic acid and/or a cyclohexane dicarboxylic acid and of which the diamine component consists completely or partly of, in particular, m- and/or p-xylylenediamine and/or hexamethylenediamine and/or 2,2,4- and/or 2,4,4-trimethyl hexamethylenediamine and/or 1,4-diaminobutan and/or isophoronediamine and of which the compositions are known from the prior art.

Other suitable partially crystalline polyamides are those which have been produced completely or partly from lactams containing 6 to 12 C atoms in the ring, optionally using one or more of the starting components mentioned above.

Particularly preferred partially crystalline polyamides (A) are polyamide-6 and polyamide-6,6 or copolyamides containing only small amounts (up to about 10% by weight) of the co-components.

Amorphous polyamides may also be used as the polyamide component (A). They are obtained by polycondensation of diamines, for example ethylenediamine, hexamethylenediamine, decamethylenediamine, 2,2,4- and/or 2,4,4-trimethylhexamethylenediamine, m- and/or p-xylylenediamine, bis-(4-aminocyclohexyl)-methane, or mixtures of 4,4,'- and/or 2,2,'-diaminodicyclohexylmethanes, 2,2-bis-(4-aminocyclohexyl)-propane, b 3,3,'-dimethyl-4,4,'-diaminodicyclohexylmethane, 3-aminoethyl-3,5,5-trimethyl cyclohexylamine, 2,5- and/or 2,6-bis-(aminomethyl)-norbornane and/or 1,4-diaminomethyl cyclohexane, with dicarboxylic acids, for example oxalic acid, adipic acid, azelaic acid, decanedicarboxylic acid, heptadecanedicarboxylic acid, 2,2,4- and/or 2,4,4-trimethyl adipic acid, isophthalic acid or small quantities of terephthalic acid. Amorphous copolymers obtained by polycondensation of several monomers are of course also suitable as are copolymers which have been prepared with addition of 25 aminocarboxylic acids, such as ω-aminocaproic acid, ω-aminoundecanoic acid or ω-aminolauric acid or lactams thereof.

Particularly suitable amorphous polyamides are the polyamides prepared from isophthalic acid, hexamethylenediamine and other diamines, such as 4,4,'-diaminodicyclohexylmethane, isophoronediamine, 2,2,4- and/or 2,4,4-trimethyl hexamethylenediamine, 2,5- and/or 2,6-bis-(aminomethyl)-norbornane; or from isophthalic acid, 4,4,'-diaminodicyclohexylmethane and ω-caprolactam; or from isophthalic acid, 3,3,'-dimethyl-4,4,'-diaminodicyclohexylmethane and lauric lactam; or from terephthalic acid and the isomer mixture of 2,2,4- and/or 2,4,4-trimethyl hexamethylenediamine.

Instead of using pure 4,4,'-diaminodicyclohexylmethane, it is also possible to use mixtures of the position-isomeric diaminodicyclohexylmethanes which consist of 70 to 99 mol-% of the 4,4,'-diamino isomer,
1 to 30 mol-% of the 2,4,'-diamino isomer,
0 to 2 mol-% of the 2,2,'-diamino isomer and, optionally, correspondingly more highly condensed diamines obtained by hydrogenation of technical diaminodiphenyl methane.

The polyamides (A) may also consist of mixtures of partially crystalline and amorphous polyamides, the amorphous polyamide component preferably being smaller than the partially crystalline polyamide component.

Partially crystalline polyamides based on polyamide-6, polyamide 6,6 and partially crystalline polyamides based on these main components with addition of co-components of the type mentioned are preferred.

Thermoplastic copolymers (B)

Thermoplastic copolymers (B), which are reacted with the polyamides (A) in accordance with the invention to form the interpolymers (D), are copolymers of
(B1) at least one monomer from the group consisting of styrenes, α-methylstyrenes, acrylonitrile, methacrylonitrile, vinyl-$C_{1-4}$-carboxylic acids, esters of acrylic or methacrylic acid with primary or secondary $C_{1-10}$ alcohols and vinyl acetate; styrenes or α-methylstyrenes preferably being present as the monomer(s) (B1),
and
(B2) at least one ester of acrylic or methacrylic acid with tertiary $C_{4-10}$ alcohols in quantities of up to 35% by weight (B2) in the copolymer (B).

Preferred monomers (B1) as structural elements of the copolymers (B) are styrene, α-methylstyrene on the one hand and, as further monomers, acrylonitrile, methyl methacrylate, n-butylmethacrylate, cyclohexylmethacrylate and vinylacetate; styrene, α-methylstyrene and also acrylonitrile and methyl methacrylate being particularly preferred. The styrenes and α-methylstyrenes may be alkyl-, haloalkylor halogen-substituted on the aromatic ring; for example they may be substituted by $C_{1-3}$ alkyl groups, by halogencontaining ($C_{1-3}$) alkyl groups and/or by halogen atoms, although styrene and α-methylstyrene are preferred. 7 Monomers (B2) in the context of the invention are tertiary (meth)acrylates and have the following general formula

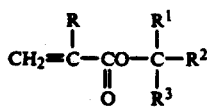

in which R=H, $CH_3$ and $R^1$, $R^2$ and $R^3$=alkyl, so that the sum of the C atoms in $R^1$, $R^2$ and $R^3$ is from 3 to 9.

Particularly preferred monomers (B2) are tert.-butylacrylate, tert.-butylmethacrylate, tert.-pentylmethacrylate and tert.-hexylacrylate and, optionally, tert.-octyl(meth)-acrylates.

The copolymers (B) are copolymers of at least two different monomers. They may also be used in the form of mixtures. Components (B) particularly suitable for the purposes of the invention consist of at least two different monomers (B1) and at least one monomer (B2), such as for example terpolymers of two components (B1), such as for example α-methylstyrene, styrene, methyl methacrylate and acrylonitrile, in combination with tert.-butyl (meth)acrylate as monomer component (B2).

The copolymers (B) contain up to 35% by weight (effectively 0.5 to 35% by weight), preferably up to 20% by weight, more preferably from 1 to 20% by weight and most preferably from 1.5 to 15% by weight of (B2).

In a particularly advantageous embodiment, component (B) consists of terpolymers of styrene/acrylonitrile/tert.-butyl (meth)acrylate, α-methylstyrene/acrylonitrile/tert.-butyl (meth)acrylate and, in particular, of terpolymers of styrene/acrylonitrile/tert.-butyl (meth)acrylate in which the terpolymer consists of 35 to 89% by weight and preferably 45 to 78.5% by weight styrene and/or α-methylstyrene, 10 to 50% by weight and preferably 20 to 45% by weight acrylonitrile and 1 to 15% by weight and preferably 1.5 to 10% by weight tert.-butyl (meth)acrylate (percentages by weight, based on the sum of components B).

The polymers (B) may be prepared in known manner by copolymerization in solution, bulk, suspension, dispersion and emulsion and by radical or thermal polymerization processes.

Copolymers (B) particularly suitable for the purposes of the invention may be produced by aqueous emulsion polymerization. The monomers (B1) and (B2) are copolymerized advantageously using anionic emulsifiers. Particularly suitable resins (B) are obtained when polymerization is carried out with anionic emulsifiers of the carboxylic acid salt type, including for example salts of oleic acid, stearic acid, resinic acid, abietic acid and disproportionated derivatives thereof. To produce the resins, these emulsifiers are used in the usual quantities, preferably in quantities of up to 3% by weight, based on the sum of monomers (B1) and (B2).

The polymerization to (B) normally takes place at a temperature above 50° C. and, more especially, at a temperature in the range from 60 to 100° C. and may be carried out in batches, semi-continuously or fully continuously.

The copolymerization is initiated by heat or by radical formers, such as for example persulfate, perphosphate, hydroperoxide, azo compounds and, optionally, even by so-called redox initiators. Inorganic water-soluble initiators are particularly suitable.

The molecular weight of the copolymers (B) may be varied in known manner by various measures including, for example, temperature, monomer concentration, quantity of initiator or by the use of so-called regulators such as, for example, organosulfur compounds, such as mercaptans and disulfides, long-chain mercaptans, for example n- and tert.-dodecylmercaptan, being advantageous. The regulators are normally dissolved in the monomer mixture and the mixture subsequently polymerized.

Particularly advantageous interpolymers according to the invention are obtained when (B) has certain molecular weights, i.e. the intrinsic viscosities ($\eta$), as measured in dl/g at room temperature in DMF, preferably in the range from 0.2 to 2 and more preferably in the range from 0.3 to 1.5.

Vinyl copolymers and/or graft polymers

Vinyl copolymers and/or graft polymers (C) according to the invention may be characterized as follows:
(C1) Copolymer component:

Resin-like polymers and copolymers of styrenes, α-methylstyrenes, acrylonitrile, methacrylonitrile, (meth)acrylates, vinyl-$C_{1-4}$-carboxylic acids and mixtures of these monomers having intrinsic viscosities [$\eta$] of from 0.3 to 1.5 dl/g (as measured in toluene at 23° C. Copolymers of styrene or α-methylstyrene with acrylonitrile optionally containing up to 40% by weight (meth)acrylates, more especially methyl methacrylate or n-butylacrylate, are preferred. Styrene derivatives must be present as monomers in any case. The styrene derivatives are present in quantities of from 100 to 10% by weight, preferably in quantities of from 90 to 20% by weight and more preferably in quantities of from 80 to 30% by weight. The vinyl polymers (C1), like the polymers (B), are obtained by standard methods, such as radical polymerization in bulk, solution, suspension or emulsion, but preferably by radical emulsion polymerization in water. The following may also be used as vinyl polymers (C):

(C2) Graft copolymer component: Graft polymers of monomers, such as styrenes, α-methyl styrenes, acrylonitrile, methacrylonitrile, alkyl (meth)acrylates, preferably mixtures of these monomers, grafted onto rubbers having glass temperatures below 0° C. and preferably below −20° C., the graft polymers having rubber contents of from 1 to 85% by weight and preferably from 10 to 80% by weight. The graft polymers may be prepared by standard processes in solution, bulk or emulsion, preferably in emulsion.

Emulsion graft polymers on particulate, highly crosslinked rubbers (diene or alkylacrylate rubbers) having gel contents above 80% by weight and mean particle diameters ($d_{50}$) in the range from 80 to 800 nm, which have been prepared by radical emulsion graft polymerization, are preferred.

Diene rubbers are, for example, polybutadiene, polyisoprene and copolymers of butadiene with up to 35% by weight comonomers, such as styrene, acrylonitrile, methylmethacrylate, $C_{1-6}$ alkylacrylate. Acrylate rubbers are, for example, crosslinked particulate emulsion copolymers of $C_1$-$C_6$ alkylacrylates, more especially $C_{2-6}$ alkylacrylates, optionally in admixture with up to 15% by weight comonomers, such as styrene, methylmethacrylate, butadiene, vinyl methyl ether, acrylonitrile and at least one polyfunctional crosslinking comonomer, for example divinylbenzene, glycolbis-acrylates, bisacrylamides, phosphoric acid triallyl esters, citric acid triallyl esters, allyl esters of acrylic and methacrylic acid, triallyl isocyanurate; the acrylate rubbers may contain up to 4% by weight of the crosslinking comonomers.

Mixtures of diene and alkylacrylate rubbers and rubbers having a so-called core/shell structure are also suitable. The rubbers are present in the form of small discrete particles. Rubbers such as these are known to have particle sizes in the range from 10 to 2000 nm.

The polymers (C2) may be prepared by standard methods, for example by radical emulsion graft polymerization of vinyl monomers in the presence of the rubber latices at temperatures in the range from 50 to 90° C. using water-soluble initiators, such as peroxodisulfate, or redox initiators. The widely used graft polymers known as ABS polymers are particularly suitable.

Mixtures of components (C1) and (C2) may also be used as component (C). This is particularly preferred when particularly tough molding compounds are to be obtained. The mixture should contain no less than 5% by weight and, preferably, no less than 15% by weight of any component.

Component (C1) and the graft shell of component (C2) may optionally contain small quantities of tertiary esters of (meth)acrylic acid (i.e. esters with tertiary alcohols) as incorporated monomer (in the same way as component (B)). The proportion of tertiary ester in (C) is preferably between 0 and 10% by weight; more particularly, (C) contains at most 50% and preferably less than 20% of the amount of tertiary ester in component (B). However, it is particularly preferred in accordance with the invention that component (C) contains no tertiary alcohol ester. It is surprising that the small quantity of preformed interpolymer D according to the invention should lead to the considerable improvement in the outer fiber strain, toughness and surface quality of the mixtures of A and C.

The thermoplastic molding compounds according to the invention may contain additives, such as lubricants and mold release agents, nucleating agents, stabilizers, flameproofing agents, dyes and also heat stabilizers antioxidants and/or light stabilizers in typical effective quantities.

The molding compounds may be produced by mixing of the components in standard mixing units, such as rolls, kneaders, single-screw or multiple-screw extruders. The temperature at which the mixtures are prepared should be at least 10° C. and best at most 90° C. above the melting point of the polyamide.

Commensurate with their property spectrum, the molding compounds may be used anywhere in the injection molding and extrusion field where the special properties, such as improved mechanical values and homogeneous surfaces, are required, for example in the automotive field for fenders, bodywork parts, or in the sports and leisure field.

EXAMPLES

Components used

A. Polyamide

Polyamide-6 having a relative viscosity (as measured on a 1% by weight solution in m-cresol at 25° C.) of 3.1

B. Copolymer B

A solution of 3723 g water, 83 g of the Na salt of disproportionated abietic acid and 43 g 1 N sodium hydroxide is introduced into a 10 liter stirred vessel. After the air has been displaced by nitrogen and the internal temperature adjusted to 75° C., 7 g potassium peroxodisulfate and 358 g water are added. 1540 g α-methylstyrene, 653 g acrylonitrile, 140 g tert.-butylacrylate and 2 g t-dodecylmercaptan are added over a period of 6 h at 75° C. Immediately after the addition, 1.2 g potassium peroxodisulfate dissolved in 46.7 g water are added and the mixture stirred for another 4 h at 75° C.

The α-methylstyrene/acrylonitrile/tert.-butylacrylate copolymer latex obtained is stabilized in the usual way by addition of 1.2% by weight, based on polymer solids, of phenolic antioxidants. The latex is then coagulated with an aqueous solution of MgSO$_4$ (Epsom salt) and acetic acid at 85 to 95° C. and at pH 4 to 5, filtered, washed until free from electrolyte and dried at 60° C.

C. Copolymer C/1a

A solution of 3723 g water, 83 g of the Na salt of disproportionated abietic acid and 43 g 1 N sodium hydroxide is introduced into a 10 liter stirred vessel. After the air has been displaced by nitrogen and the internal temperature has been adjusted to 75° C., 7 g potassium peroxodisulfate and 358 g water are added. 1610 g α-methyl styrene, 723 g acrylonitrile and 2 g t-dodecylmercaptan are added over a period of 6 h at 75° C. Immediately after the addition, 1.2 g potassium peroxodisulfate dissolved in 46.7 g water are added and the mixture stirred for another 4 h at 75° C.

The α-methylstyrene/acrylonitrile copolymer latex obtained is stabilized by addition of 1.2% by weight, based on polymer solids, of phenolic antioxidants. The latex is then coagulated with an aqueous solution of MgSO$_4$ (Epsom salt) and acetic acid at 85 to 95° C. and at pH 4 to 5, filtered, washed until free from electrolyte and dried at 60° C.

Graft copolymer C/2a

To prepare graft polymer C/2a, 36 parts by weight styrene and 14 parts by weight acrylonitrile are grafted by emulsion polymerization onto 50 parts by weight of a coarse-particle rubber having a mean particle diameter of the butadiene graft base present in latex form of 0.4 μm and a gel content of 86% by weight (as determined by the method of M. Hoffmann et al, Polymeranalytik I und II, Georg Thieme Verlag, Stuttgart (1977)).

D. Interpolymer 1:

70 Parts by weight polyamide (A) and 30 parts by weight copolymer (B) are separately but simultaneously introduced into a continuous-action twin-screw extruder and homogenized in the melt at 272° C. (residence time approximately 2 minutes), cooled, granulated and dried.

Production and testing of molding compounds 1 (comparison) and 2 to 4 (invention)

The components (cf. Table 1) were introduced into a continuous-action twin-screw extruder and homogenized at a melt temperature of 265° C., cooled, granulated and dried.

Test bars measuring 80×10×4 mm$^3$ were made from the injection molding compounds in a standard injection molding machine and were used to determine elasticity modulus in bending (DIN 53 457), 3.5% flexural stress (DIN 53 452), Izod impact strength (ISO 180) at room temperature and at −20° C. and the VICAT softening temperature VST/B (DIN 53 460).

TABLE 1

| Molding compound | | 1 (Comparison) | 2 | 3 | 4 |
|---|---|---|---|---|---|
| | | | According to the invention | | |
| Composition: | | | | | |
| Component | | | | | |
| A (% by weight) (polyamide A) | PA-6 | 70 | 65 | 65 | 60 |
| C (% by weight) (styrene copolymer) | C/1a | 30 | 30 | 25 | 20 |
| D (% by weight) (interpolymer D) | | — | 5 | 10 | 20 |
| Properties: | | | | | |
| E modulus in bending [MPa] | | 2976 | 3012 | 2900 | 2816 |
| 3.5% flexural stress [MPa] | | —* | 104.1 | 102.5 | 100.4 |
| Izod impact strength | | | | | |
| $a_n$ [kJ/m$^2$] at RT | | 22.5 | 35.1 | 45.6 | 53.6 |
| at −20° C. | | 32.8 | 41.4 | 56.5 | 55.3 |
| Vicat B softening temperature [°C.] | | 156 | 155 | 160 | 162 |

*Outer fiber strain <3.5% RT = room temperature

The test results obtained show that molding compounds 2 to 4 according to the invention have improved toughness, heat resistance and outer fiber strain. In addition, some of the moldings made from comparison compound 1 show a tendency to delaminate whereas the moldings produced in accordance with the invention containing interpolymer (D) as compatibility promoter show excellent smooth and homogeneous surfaces.

Production and testing of molding compounds 5 (comparison without interpolymer (D) and molding compounds 6 to 8 (according to the invention) as a mixture of the copolymer component C/1a with the graft polymer C/2a (see Table 2)

Mixing and testing were carried out as in the preceding Example.

The results show that particularly high-impact molding compounds are obtained with a mixture of C1a/C2a when the interpolymer D is used in accordance with the invention.

TABLE 2

| Molding compound | 5 (Comparison) | 6 | 7 | 8 |
|---|---|---|---|---|
| | | According to the invention | | |
| Composition: | | | | |
| A (% by weight) (polyamide A) | 50 | 50 | 45 | 40 |
| C (1a) (% by weight) (styrene copolymer) | 25 | 20 | 20 | 20 |
| D (% by weight) (interpolymer D) | 0 | 5 | 10 | 20 |
| C (2a) (% by weight) (styrene copolymer) | 25 | 25 | 25 | 20 |
| Properties: | | | | |
| E-modulus in bending [MPa] | 2270 | 2340 | 2290 | 2300 |
| Izod impact strength | | | | |
| $a_n$ [kJ/m$^2$] at RT | 65.8 | 9 × ub. 1 × 102 | 8 × ub. 2 × 47 | ub. |
| at −20° C. | 58.3 | 121.7 | 5 × ub. 5 × 258 | 7 ub. 3 × 270 |

RT = room temperature
ub. = unbroken (10 test specimens were subjected to the test).

We claim:

1. Interpolymers of
(A) from 40 to 80% by weight polyamides with or without partial crystallinity and
(B) from 20 to 60% by weight thermoplastic copolymers or mixtures of several thermoplastic copolymers of (B1) monomers comprising (B1.1) at least 15% by weight based on (B) of at least one monomer selected from the group consisting of styrenes and α-methylstyrenes which are unsubstituted or substituted by at least one haloalkyl or halogen, and
(B1.2) from 0 to 50% by weight based on (B), of other monomers selected from the group consisting of vinyl acetate, acrylonitrile, methacrylonitrile, and acrylate or methacrylate esters of primary or secondary $C_{1-10}$ alcohols, and
(B2) from 0.5 to 35% by weight based on (B) of at least one ester of acrylic or methacrylic acid with tertiary $C_4$–$C_{10}$ alcohols prepared by homogenization of components (A) and (B) in the melt in standard mixing and kneading units at temperatures above the melting point of the higher-melting component until the interpolymers are formed.

2. Interpolymers as claimed in claim 1, characterized in that thermoplastic copolymers (B) of
(B1.1) at least 30% by weight styrene or α-methylstyrene or both and
(B1.2) from 0 to 50% by weight acrylonitrile, methyl methacrylate, n-butyl methacrylate, cyclohexyl methacrylate or vinylacetate and
(B2) from 1 to 20% by weight tertiary (meth)acrylates corresponding to the following formula

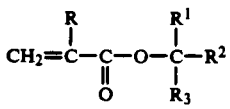

in which
R=H, CH₃ and
R¹, R², R³=alkyl so that the sum of the carbon atoms in R¹, R² and R³ is from 3 to 9, are used to form the interpolymers.

3. Interpolymers as claimed in claim 1, characterized in that thermoplastic copolymers (B) of
(1.1) α-methylstyrene or styrene and
(B1.2) acrylonitrile or methylacrylate and
(B2) tert.-butyl(meth)acrylate are used to form the interpolymers.

4. Interpolymers as claimed in claim 1, characterized in that thermoplastic copolymers (B) of terpolymers containing
(B1.1) at least 30% by weight styrenes and
(B1.2) 10 to 50% by weight acrylonitrile,
(B2) and 1 to 20% by weight tert.-butyl (meth)acrylate, the percentages by weight totalling 100, based on the sum total of the % by weight components of component (B), are used to form the interpolymers.

5. Interpolymers as claimed in claim 1, characterized in that copolymers (B) having intrinsic viscosities of from 0.2 to 2 (as measured in dl/g at room temperature in DMF) are used to form the interpolymers.

6. Interpolymers as claimed in claim 4 wherein component (B1.1) is at least 45% by weight styrene.

7. Interpolymers as claimed in claim 4 wherein component (B1.2) is 20 to 45% by weight acrylonitrile.

8. Interpolymers as claimed in claim 4 wherein component (B2) is 1.5 to 15% by weight.

9. Interpolymers as claimed in claim 5 wherein the intrinsic viscosity of copolymers (B) is from 0.3 to 1.5, as measured in dl/g at room temperature in DMF.

10. Interpolymers of
(A) from 40 to 80% by weight polyamides with or without partial crystallinity and
(B) from 20 to 60% by weight based on (B) thermoplastic copolymers or mixtures of several thermoplastic copolymers of (B1) monomers comprising
(B1.1) at least 45% by weight based on (B) styrenes or α-methylstyrene, and
(B1.2) from 20 to 45% by weight based on (B), of acrylonitrile, and
(B2) from 1.5 to 15% by weight based on (B) of tert. butyl acrylate, prepared by homogenization of components (A) and (B) in the melt in standard mixing and kneading units at temperatures above the melting point of the higher-melting component until the interpolymers are formed.

* * * * *